J. F. BLESS.
Chills for Casting Smothing-Irons.
No. 134,193. Patented Dec. 24, 1872.
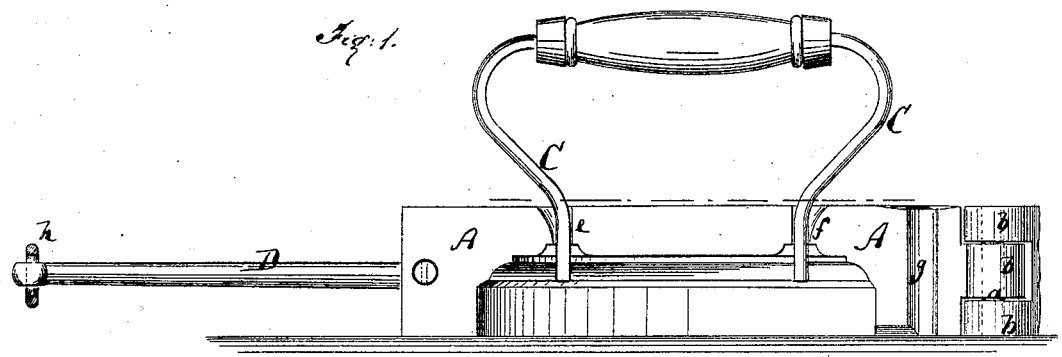
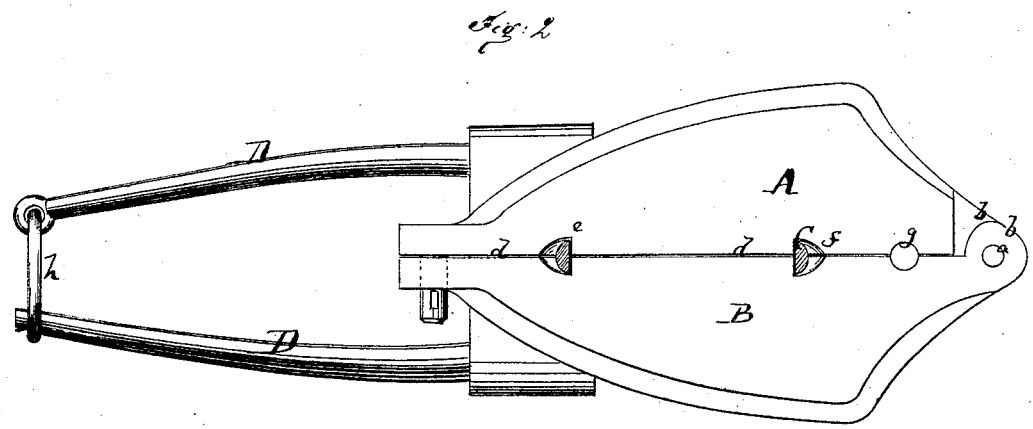
Witnesses:
Chas. Nida
C. Sedgwick
Inventor:
J. F. Bless
per
Attorneys.

UNITED STATES PATENT OFFICE.

JAMES F. BLESS, OF NEWARK, NEW JERSEY, ASSIGNOR TO HIMSELF AND ROBERT DRAKE, OF SAME PLACE.

IMPROVEMENT IN CHILLS FOR CASTING SMOOTHING-IRONS.

Specification forming part of Letters Patent No. 134,193, dated December 24, 1872.

*To all whom it may concern:*

Be it known that I, JAMES F. BLESS, of Newark, in the county of Essex and State of New Jersey, have invented a new and Improved Chill for Casting Smoothing-Irons, of which the following is a specification:

Figure 1 is a side view, and Fig. 2 a top view, of my invention.

Similar letters of reference indicate corresponding parts.

This invention relates to a new form of mold for casting a smoothing-iron in, with the object of obtaining a chilled surface for the entire iron. This result has long been considered desirable, but not accomplished on account of the difficulty of connecting the smoothing-iron with its handle. I accomplish the desired result by making the mold jointed and applying the hinge at one end, so that it can be freely opened to release the iron and handle when finished. The invention also consists in providing the mold with a certain advantageous form of handle, which relieves the hinge from strain during expansion.

A B, in the drawing, are the two sections of the metal mold, hinged or joined together at the back by a pin, $a$, which passes through ears $b\ b$ projecting from the back of the mold. The mold is, by being made in two parts, separated in the middle lengthwise, as shown in Fig. 2. In the line of division $d$ it has three openings, $e, f,$ and $g,$ which lead from above directly into the interior of the mold. The two front openings $e f$ are for the reception of the handle C, which is inserted before the cast metal is poured into the mold to become part of the cast sad-iron. After the iron has been cast, the two sections of the mold are swung apart on the pivot $a$, and the iron with the handle can be removed. The surface of the sad-iron will be formed smooth and glossy when cast in this chill-mold. The third aperture $g$, which, however, is not necessarily in the division line $d$, serves to conduct the liquid metal into the mold. D D are projecting handles or rods on the front ends of the sections A B. Their ends are, when the mold is to be charged, connected by a link, $h$, which holds the mold closed. The rods D serve as handles for manipulating the molds, and also to relieve the pivot $a$ from strain while the mold is being enlarged under the influence of the heated metal.

Having thus described my invention, I claim as new, and desire to secure by Letters Patent—

1. A jointed chill-mold for sad-irons, made with the openings $e$ and $f$, substantially as herein shown and described.

2. The handles D D applied to the jointed sections A B of a sad-iron mold, as set forth.

JAMES F. BLESS.

Witnesses:
  EDGAR B. DRAKE,
  ISAAC GASTON.